(12) United States Patent
Fujita et al.

(10) Patent No.: US 6,197,432 B1
(45) Date of Patent: Mar. 6, 2001

(54) SLIDING MATERIAL HAVING EXCELLENT ABRASION RESISTANCE

(75) Inventors: Masahito Fujita; Yasushi Saitou, both of Narashino (JP)

(73) Assignee: NDC Company, Ltd., Chiba-ken (JP)

( * ) Notice: Subject to any disclaimer, the term of this patent is extended or adjusted under 35 U.S.C. 154(b) by 0 days.

(21) Appl. No.: 09/214,132

(22) PCT Filed: Jul. 30, 1997

(86) PCT No.: PCT/JP97/02637

§ 371 Date: Dec. 29, 1998

§ 102(e) Date: Dec. 29, 1998

(87) PCT Pub. No.: WO98/04756

PCT Pub. Date: May 2, 1998

(30) Foreign Application Priority Data

Jul. 30, 1996 (JP) .................................. 8-216720

(51) Int. Cl.$^7$ ........................................... B22F 7/08
(52) U.S. Cl. ................... 428/553; 428/677; 75/247; 75/255; 420/474; 420/496; 384/912
(58) Field of Search .................... 428/553, 677; 75/247, 255; 420/474, 496; 384/912

(56) References Cited

U.S. PATENT DOCUMENTS

| | | | |
|---|---|---|---|
| 4,334,926 | * | 6/1982 | Futamura et al. . |
| 4,452,866 | * | 6/1984 | Kamiya et al. . |
| 5,279,638 | * | 1/1994 | Asada et al. . |
| 5,326,384 | * | 7/1994 | Asada et al. . |

FOREIGN PATENT DOCUMENTS

| | | |
|---|---|---|
| 2703325 | of 1978 | (DE) . |
| 57-50844 | of 1982 | (JP) . |
| 64-39307 | of 1989 | (JP) . |
| 6-145845 | of 1994 | (JP) . |

* cited by examiner

*Primary Examiner*—Timothy M. Speer
*Assistant Examiner*—Jason Savage
(74) *Attorney, Agent, or Firm*—Sughrue, Mion, Zinn, Macpeak & Seas, PLLC (57) ABSTRACT

A sliding material which is used for bearings, washers and other parts of automobiles, industrial machines, agricultural machines and the like, possesses an excellent abrasion resistance, and is useful under sever boundary lubricating conditions. The sliding material comprises a back plate (5) of a steel plate and a sinter bearing layer integrally provided on one surface of the back plate (5). A powder (2) of a hard material is dispersed in an amount of 0.5 to 20% by weight in a matrix (4) of the sinter bearing layer. The matrix (4) comprises 1 to 30% by weight of Pb and 1 to 15% by weight of Sn with the balance consisting of Cu. The powder (2) of a hard material comprises 7.5 to 9.5% by weight of Cr, 27 to 30% by weight of Mo, and 2.0 to 3.0% by weight of Si with the balance consisting of Co.

6 Claims, 5 Drawing Sheets

SLIDING MATERIAL HAVING EXCELLENT ABRASION RESISTANCE

FIELD OF THE INVENTION

The present invention relates to a sliding material with excellent abrasion resisting property, such as high abrasion hardness and, more particularly to a sliding material, in which the sliding material is suitable as material of a sliding member, such as the sliding bearing and washer used in vehicles, industrial machines and agricultural machines, in which the sliding material is excellent in the abrasion resisting property and in which the sliding material is effective for applications under a severe boundary lubricating condition without a circulation of an lubricating oil.

PRIOR ART TECHNIQUE

In general, among sliding materials, the sliding material, which is used as sliding bearing members, such as the sliding bearing, bush and washer, are made mainly with sintered alloy, which consists substantially of bronze alloy or lead bronze alloy. These alloys exhibit an excellent slidablity under a lubricating conditions utilizing the oil lubrication, in which the lubricating oil is circulated through a space between the sliding member and the rotating shaft supported thereby.

The lubricating condition becomes to be severe and then reaches a boundary lubricating condition. In the boundary lubricating condition, it is imposible to utilize the oil lubricantion. In addition to this, the boundary lubricating condition causes an occurence in excess of irregular abrasion with respect to the sliding material and the rotating shaft supported thereby.

Namely, a lead bronze alloy used as a sintered layer of the sliding material has therein lead content which is excellent in the lubricating property and affinity. Additionally, the lead particles are dispersed without segregation in all parts of the bronze base matrix of the sintered alloy. Thus, the bearing member or sliding member using as a raw material of sintered materials of bronze or lead bronze alloy exhibit a satisfactory lubricating property under lubricating conditions utilizing the oil lubrication. However, under severe boundary lubricating conditions without a circulation of the lubricating oil, the bearing member or sliding member by fabricated by the sintered bronze or lead bronze alloy do not exhibit a good abrasion resisting property. Additionally, it is reported that an excessive abrasion is caused at the time of using the bearing member of bronze or lead bronze alloy under the boundary lubricating condition.

To solve the above defects, Japanese Patent Publication No. 50844/1982 proposes bearing materials or sliding materials, which are used for making the bearing member or sliding member. The materials comprise base matrix of lead bronze alloy and dispersed particles of hard compounds, such as Fe, P powder, Mo and Co powder, and Ni—base alloy powder. The dispersed particles are precipitated in the base matrix. The proposed sliding materials have therein the improved seizure resisting property and abrasion resisting property.

Japanese Patent Publication No. 198440/1994 also proposes sliding materials or bearing materials, which are used for making the bearing member or sliding member. The proposed material are is imparted with a good seizure resisting property and an excellent abrasion resisting property, by adding graphite pharticles and Ni—B compound particles to the base matrix of lead bronze alloy.

However, the hard particles, which are precipitated as hard element or intermetallic compound in the base matrix of these bearing materials and sliding materials, are mainly those of intermetallic compound, such as Fe, P Ni—B and have a tendency to be crystallized. Although the precipitation of hard particles in the base matrix has an effect of enhancing the abrasion resisting property of lead bronze base matrix of the sliding material. These particles of hard element or intermetallic compound have thereon sharply pulverized surface shapes with knife edges. Consequently, it is not suitable to use as bearing materials or sliding materials for making bearing member or sliding member of engines and drive parts of vehicles or the like, because the sliding or bearing member with use of these bearing or sliding materials will cause an abrasion of the rotating shaft supported by sliding or bearing member, shaft, despite the fact that the abrasion of the bearing member or sliding member themselves can be reduced.

In general, the bearing materials or the sliding materials are subjected as starting materials to a mechanical working process, thereby resulted in the sliding bearing member with use of engine parts of vehicles or the like. The resultant sliding bearing member has thereon a sliding surface, which is subjected to a cutting process utilizing a machine cutter or grinder. However, during the course of cutting or grinding of the bearing material or sliding material, it is impossible that the bearing or sliding material will be subjected to a cutting or grinding process utilizing a cemmented carbide tool. This is because the bearing or sliding material has therein a precipitation with excessively high hardness.

Consequently, the cutting or grinding process of the sliding or bearing material with excessively high hardness does not permit the use of the cemmented carbide cutter and therefor necessiates the use of a diamond cutting tool with hardness higher than that of the cemmented carbide cutters.

Namely, as described above, the proposed bearing material or sliding material has therein a base matrix of bronze alloy or lead bronze alloy and hard particles added thereto and precipitated therein.

The additive, which is added as hard material particles to the base matrix of bronze or lead bronze alloy, is precipitated in the base matrix of bronze or lead bronze alloy, thereby enhancing the hardness of the base matrix. Additionally, the additive to be added has therein the intermetallic compound or hard metallic particle with Vickers hardness (Hv) of 1,000 or above.

Therefore, the resultant bearing material or sliding material is excessively hard. In addition, the additive, such as the hard material particles, have inferior property of sintering with lead bronze alloy constructing the base matrix of the bearing material. Therefore, during the sliding bearing member, such as the slide bearing or the like, supports a rotating shaft, hard material particles being added to and precipitated in the base matrix are detached as worn-out particles and cause a damage to the rotating shaft.

The property of sinterability of the hard material particles with respect to the base matrix lead bronze alloy is inferior and hence the hard material particles have another problems. When the condition of lubrication prevailing between the sliding bearing and the rotating shaft supported thereby reaches the boundary lubricating condition, the sliding bearing and the rotating shaft become to be in direct contact with each other. In such a direct contact, hard material particle precipitated in the base matrix intervene between the sliding surface of the slide bearing and the rotating shaft, and the load applied by the rotating shaft is supported only by the hard material particles, instead of the base matrix of the bronze alloy. Under this condition, frictional heat is generated between the supported shaft and the hard material particles precipitated in the base matrix of bronze alloy. But, it is difficult that the friction heat is dissipated to the outside.

In addition to this, the generation of friction heat is accelerated, so as to cause a temperature elevation to an excessive high degree, thereby resulting in seizure between the slide bearing and the rotating shaft supported thereby.

The present invention seeks to overcome the above drawbacks inherent in the prior art bearing materials and sliding materials, and it has an object of providing a bearing material or a sliding material with an excellent abrasion resisting property. The sliding material comprises a base matrix constituted by a copper base sintered alloy, such as lead bronze base sintered alloy, and hard material particles dispersed or precipitated without any segregation in all parts of the base matrix of lead bronze alloy. When the slide bearing is fabricated by using the inventive material, the hard material particles of the inventive material have an adequate hardness such as to cause no damage to the rotating shaft supported by a slide bearing. Additionally, the hard material particles have a satisfactory property of sinterability with respect to lead bronze alloy of the base matrix. As a result, the slide bearing made by the inventive sliding material provides a frictional resistance adequate to use it under a boundary lubricating condition.

The slide bearing fabricated by using the inventive bearing material or a sliding material has thereon a flat sliding surface which enables a support without any friction of the rotating shaft. The sliding surface is free from any excessively hard intermetallic compound particles, and hence causes no damage to the rotating shaft.

In addition, the hard particles to be added to the base matrix of the inventive bearing material are not an intermetallic compound additive but alloy particles, and have therein an excellent property of sinterability with respect to the base matrix of the bronze alloy.

With use of the slide bearing using the inventive bearing material, a friction heat has a tendency to be dissipated without difficulties, owing to high coefficient of heat of the inventive bearing material. As a result, the slide bearing causes only a slight temperature elevation on the sliding surface thereof.

DISCLOSURE OF THE INVENTION

The sliding material according to the invention is a sliding material having an excellent abrasion resisting property, and comprises a back steel sheet and a sintered bearing layer integral with one surface of the back steel sheet. The sintered bearing layer has therein a base matrix and 0.5 to 20% by weight of hard material particles dispersed and precipitated in the base matrix. The base matrix is composed of 1 to 30% by weight of Pb, 1 to 15% by weight of Sn, and remainder being substantially Cu, while the hard material particles is composed of 7.5 to 9.5% by weight of Cr, 27 to 30% by weight of Mo and 2.0 to 3.0% by weight of Si, the remainder being Co.

The hard material particles precipitated in the base matrix have a Vickers hardness (Hv) of 700 to 800.

The hard material particles have therein a two-phase matrix. The two-phase matrix has one phase consisting substantially of Co. The two-phase matrix has other phase consisting substantially of a hard precipitate of Cr, Mo, Si or Co precipitated in said one phase.

The hard material particles are at least partly round in shape.

The hard material particles have a diameter of 100 $\mu$m or below.

BEST MODE OF CARRYING OUT THE INVENTION

As described before, the hard material particles, which are precipitated in the sintered alloy layer constituting the base matrix of the prior art bearing material or sliding material with use for making the sliding member, such as the slide bearing or the like, are mainly constituted by intermetallic compound additives. Any of these intermetallic compound additives have therein a high hardness, typically, a Vickers hardness (Hv) of 1,000 or above.

Namely, such intermetallic compound particles with high hardness are obtained by using a pulverizing process in stead of an atomizing process.

The pulverizing process comprises steps of forming an ingot body substantially consisting the intermetallic compound and of then pulverizing the ingot body into intermetallic compound particles. Therefore, the resultant intermetallic compound particles, which are added to the prior art sliding material, have thereon sharp edges projected from the sliding surface of the prior art bearing member made by the prior art sliding material. Accordingly, in the case of supporting the rotating shaft by the prior art bearing, such sharp edges to be projected from the sliding surface of the slide bearing have a direct contact with the rotating shaft, and hence causes a generation of surface scar, cut or the like left on the rotating shaft.

On the contrary, the hard material particles to be added and precipitated according to the invention are composed of metallic alloy particles without sharp edges, instead of the intermetallic compound particles with sharp edges. Namely, according to the invention, these metallic alloy particles are added and precipitated as hard material particles in the sintered alloy layer constituting the base matrix of the bearing material or sliding material, thereby enhancing an abrasion hardness thereof. These metallic alloy particles have thereon smooth surface and do not cause a generation of scar, cut or the like left on the rotating shaft, which is supported in or in contact with the sliding surface of the sliding member fabricated by using the inventive sliding material. In detail, these metallic alloy particles to be added and precipitated according to the invention have thereon, shape like sphere or the like. And they have therein an abrasion hardness adequate to eliminate any damage with respect to the rotating shaft supported by the sliding surface. From this reason, the addition of metallic alloy particles to the base matrix are effective in an enhancement of the abrasion resisting property thereof.

Furthermore, the metallic alloy particles to be added as the hard material particles to the base matrix according the invention should be selected by taking into considerations of such fact that the temperature rise of the bearing surface enabling a support of the rotating shaft is effectively prevented, that the property with respect to heat dissipation through the slide bearing is enhanced and that these metallic alloy particles are effectively sintered with the base matrix composed of lead bronze alloy.

As described in the above, one feature of the invention exists in the addition of metallic alloy particles as the hard material particles to a base matrix of the sliding material. The metallic alloy particles have therein preferably a Cr—Mo—Co base alloy composition.

As to the metallic alloy particles with thus alloy composition, it is necessiated that they are prepared as particles having thereon a round shape. Such round shaped particles are very adequately prepared by an atomizing porcess.

One of prefarable examples of the metallic alloy particles, which meet the above requirements, is a Co base alloy composed of 28% of Mo, 9% of Cr and 2.5% of Si, the remainder being Co. Particularly, in comparison to the hardness of metal particles of sole Mo or Co, which reaches only 200 to 500 in the Vickers hardness (Hv), the Co base alloy particle has a Vickers hardness (Hv) of 750. The Co base alloy particle enables to meet the above requirements with respect to the hardness and the sintering property. The property of sinterability implys an extent, to which the metallic particles may be binded to the base matrix.

Figure 5:
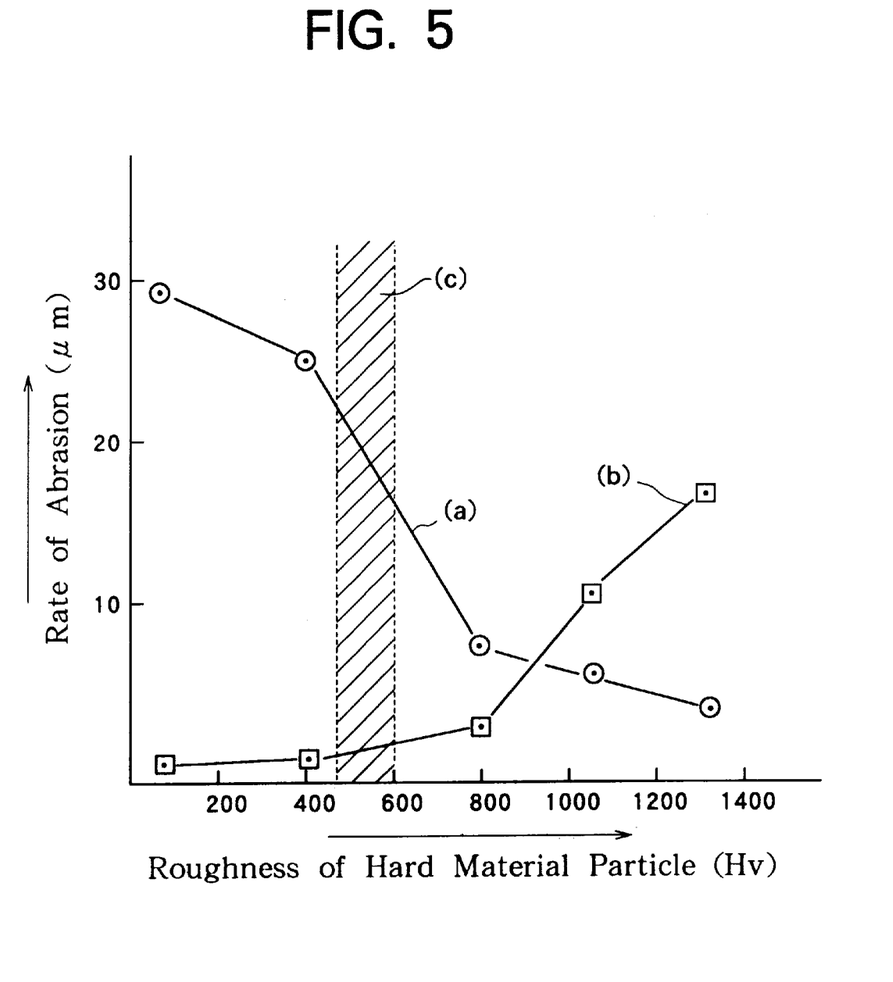
FIG. 5 is a graph showing a relation between the hardness of the hard material particle to be added and the abrasion rate of the sliding material.

Namely, the abrasion test shown in FIG. 5 was conducted. The abrasion test had employed the slide bearings fabricated by the sliding materials containing the precipitated particles with Vickers hardness ranging between 50 and 1350. The precipitated particles employed in the abrasion test are divided into the inventive metallic alloy particles and the conventional intermetallic compound particles or the like. Additionally, the abrasion test had an object of examining an effect of the hardness of the precipitated particles with respect to the abrasion rate of the rotating shaft supported by the slide bearing. The abrasion test was conducted by the following way.

The sliding material used for making the slide bearing was prepared in a manner, such that it comprises a base matrix of lead bronze alloy containing 23% of Pb, 2% of Sn and balance of Cu, and the precipitated particles being incorporated at the same ratio in the base matrix. The abrasion test employing the slide bearing was conducted in accordance with the conditions shown in Table 1, thereby resulted in obtaining a relation between the abrasion rate of the rotating shaft supported by the slide bearing and the Vickers hardness of the precipitated particles.

TABLE 1

Abrasion test conditions

| Remarks | Condition | Unit |
| --- | --- | --- |
| Dimensions of the slide bearing: | | |
| Inner diameter | 20 | mm |
| Length | 20 | mm |
| Rotating shaft: | | |
| Material | JIS S55C | |
| Vickers Hardness | 600 | Hv |

TABLE 1-continued

Abrasion test conditions

| Remarks | Condition | Unit |
| --- | --- | --- |
| Roughness | 1.0 | $\mu$m |
| Rotation Rate of the ratating shaft | 500 | r.p.m. |
| Load Applied on the rotating shaft | 200 | kg/cm$^2$ |
| Testing interval | 100 | hrs. |
| Lubricating Oil | Light oil | |
| Amount of precipitated particles to be added | 5.0 | weight % |

As the hard material particles, such as the precipitated particles with hardnesses (Hv) of 1,000 or above, the abrasion test had employed the prior art intermetallic compound system particles with hardnesses (Hv) of 1,000 and above. As the precipitated particles with hardness (Hv) of 1,000 or below. Cr—Mo—Si—Co alloy particles had been employed. As precipitated particles with Hv of 500 or below metal particles of sole Mo. Co. etc, had been used.

FIG. 5 shows the results of the abrasion tests

In the graph shown in FIG. 5, the horizontal axis shows the abrasion rate of the slide bearing and the rotating shaft supported by the slide bearing, and the vertical axis shows the hardness of the precipitated particles. Additionally, in FIG. 5, labeled (a) is the abrasion of the bearing, and (b) shows the abrasion rate of the rotating shaft supported in the slide bearing. The hardness of the rotating shaft supported by the slide bearing is in a range labeled (c).

Consequently, in FIG. 5, the abrasion rate is plotted in relation to the hardness of precipitated particles contained in the sliding material.

As shown in FIG. 5, from the abrasion test conducted under the conditions shown in Table 1, it was seen that the rotating shaft supported by the slide bearing with 5% by weight of intermetallic compound particles having Hv exceeding 1,000 is abraded in a considerable degree during the course of a long abrasion test for 100 hrs. The abrasion in the amount of the rotating shaft is remarkably increased, in the case of using the sliding material containing precipitated particles with the hardness (Hv) exceeding 800.

On the other hand, the sliding material is subjected to the abrasion, which is reduced with increasing hardness of the precipitated particles.

The review of the above abrasion test result teaches that the hardness of the precipitated particles should be in a prefarable range to meet two requirements with respect to the sliding material using as the slide bearing. One of requirements implys that the sliding material is difficult to be abraded by itself, and the other requirement implys that the rotating shaft is difficult to be abraded by the sliding material.

Furthermore, the review of the above abrasion test teaches that the preferable range in hardness of the precipitated particles is between 700 and 800 in Hv.

Beside this requirement, the precipitated particles should have an improved property of sinterability with respect to the base matrix alloy, such as bronze base alloy containing Pb, the remainder being Cu—Sn. This reason is following.

Figure 3:
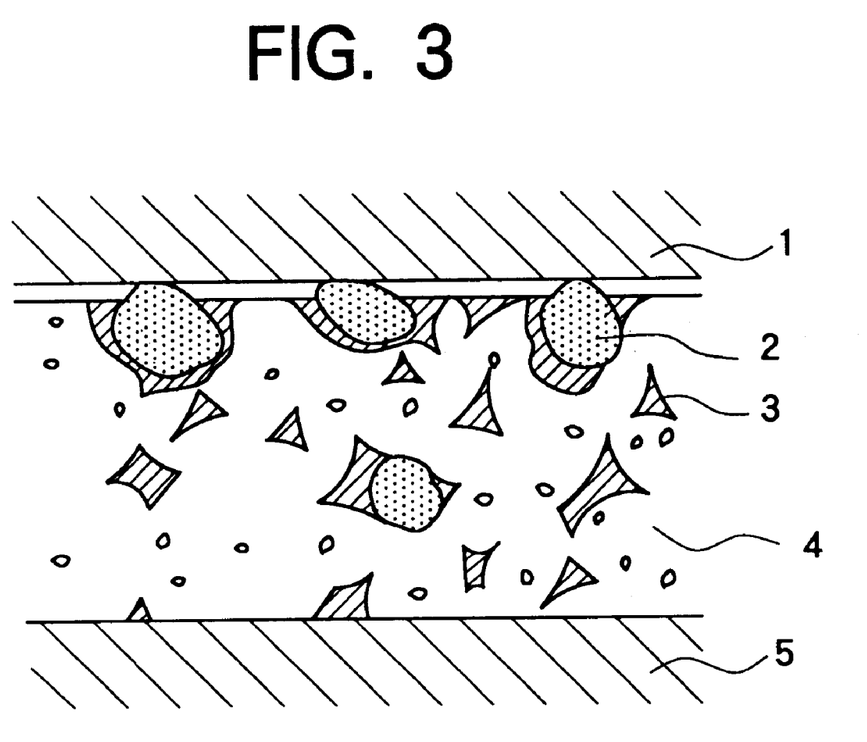
FIG. 3 is an explanative view showing the prior art bearing member supporting thereon the rotating shaft.
Figure 4:
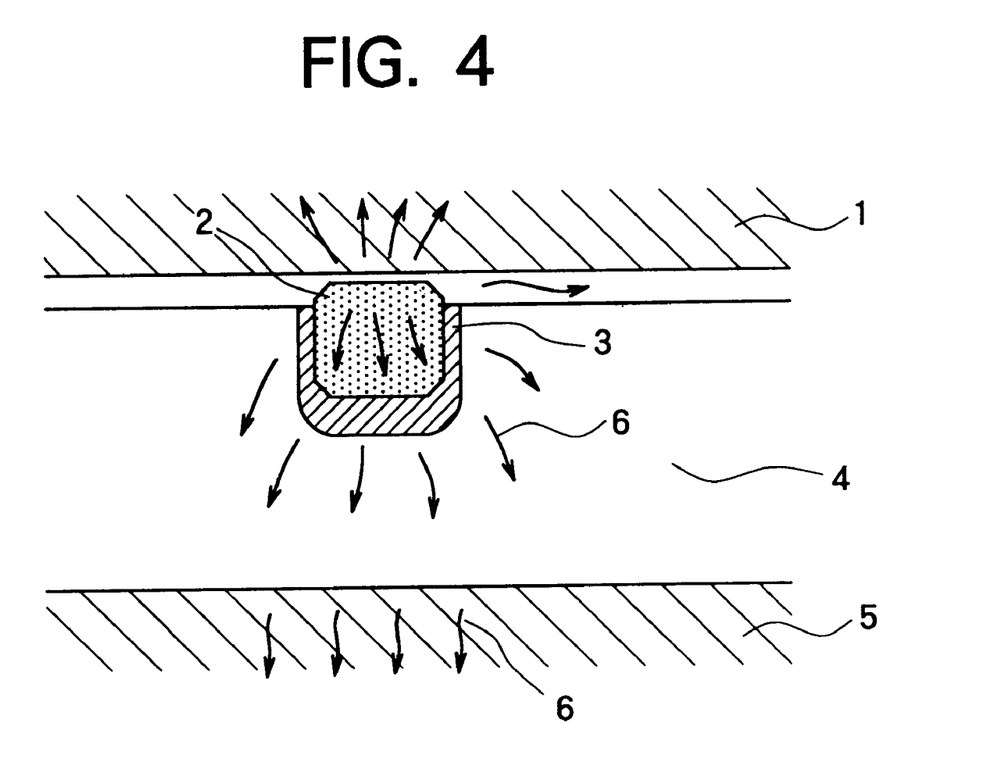
FIG. 4 is an explanative view showing a behavior of heat dissipation on the bearing member shown in FIG. 3.

FIG. 3 is a view showing the matrix of a side bearing fabricated by using a prior art sliding material containing intermetallic compound particles as precipitated particles. FIG. 4 is a view showing a the manner of dissipation of frictional heat generated in the use of the slide bearing. As is seen from FIGS. 3 and 4, the prior art slide bearing is inferior in the property of sinterability, and also poses a problem in the heat dissipation.

More specifically, in FIGS. 3 and 4, reference numeral 1 designates a rotating shaft supported by the slide bearing, 2 designates intermetallic compound shows particles. 3 shows Pb phase and 4 shows a base matrix alloy. 5 shows a back steel sheet, and 6 a heat current of frictional heat. A slide bearing is formed by covering the back steel sheet 5 with a sintered alloy layer. In the sintered alloy layer, the intermetallic compound particles 2 with high hardness and the Pb phase are precipitated in the base matrix alloy 4.

In the case that the property of sinterability between the intermetallic particles 2 with high hardness and the base matrix alloy 4 is inferior, the intermetallic compound particles 2 are surrounded by the Pb phase 3 which has therein a low melting point. The intermetallic compound particles 2 thus would be in a state just like they are floating in a pool resulting from the fusing or softening of the Pb phase 3.

Under this condition, the frictional heat 6 generated between the rotating shaft 1 and the intermetallic compound particles 2, has a tendency to be dissipated into the base matrix alloy 4 via the pool of the Pb phase 3.

The Pb phase 3 has a thermal conductivity which is inferior to, i.e., 1/10 or below, in comparison with the thermal conductivity of the Cu base matrix alloy. The inferior thermal conductivity constitutes a barrier stopping the frictional heat dissipation and then an effective dissipation of the frictional heat cannot be obtained.

By way of example, the thermal conductivity of the Pb phase 3 is approx. 0.082 cal/cm·deg. sec., while the thermal conductivity of the base matrix alloy 4 is approx. 0.94 cal/cm·deg. sec.

Figure 1:
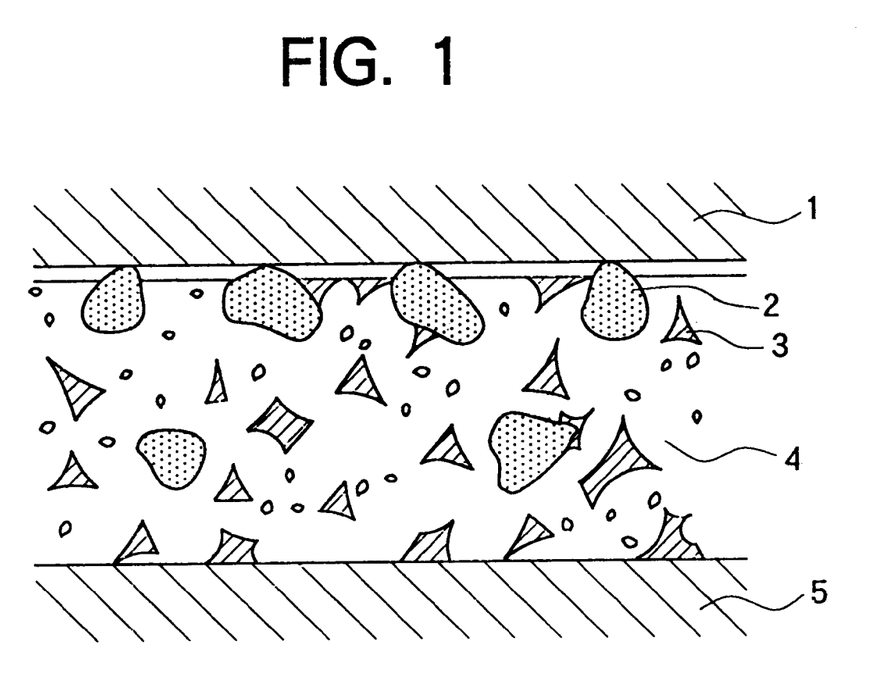
FIG. 1 is an explanative view showing one example of the sliding material supporting thereon the rotating shaft.
Figure 2:
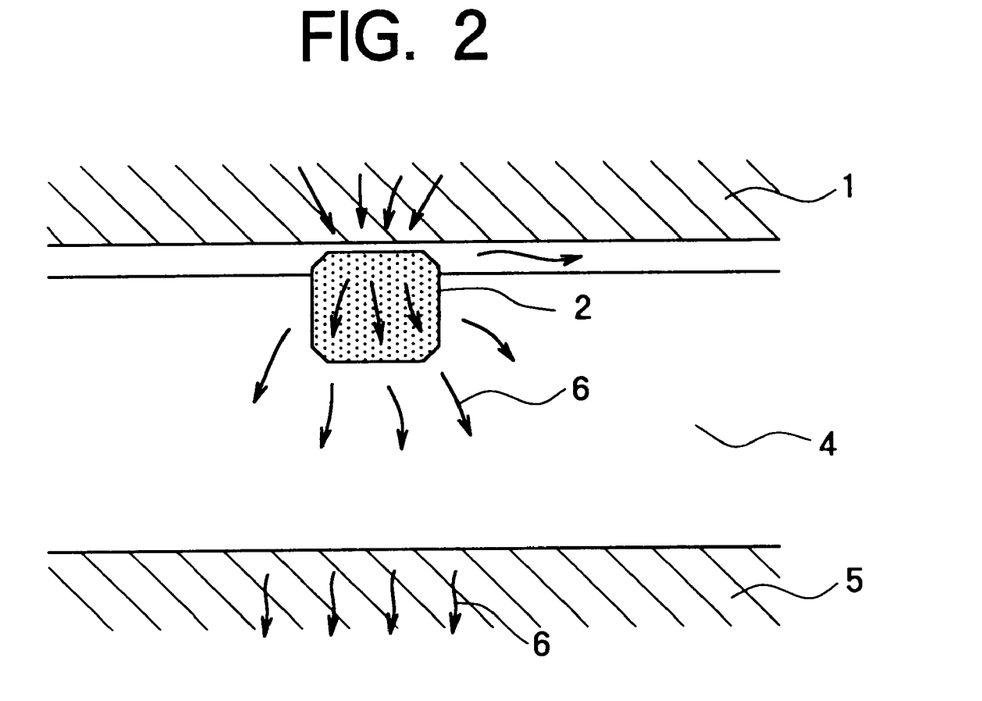
FIG. 2 is an explanative view showing a behavior of heat dissipation of the friction heat generated on the bearing member fabricated by the sliding material according to the invention.

On the contrary, FIG. 1 is a view showing the matrix of a slide bearing comprising the sliding material according to the present invention, and also FIG. 2 is an explanative view showing the manner of dissipation of frictional heat generated in the use of the slide bearing of FIG. 1. Referring to FIGS. 1 and 2, the base matrix alloy 4 has therein the same construction as the base matrix alloy 4 as shown in FIGS. 3 and 4, and has therein a chemical composition different from the base matrix alloy of FIGS. 3 and 4. this difference exists in the regard, such that the Cr—Mo—Si—Co alloy particles are added and precipitated as the hard material particles 2 in the base matrix alloy 4. The hard material particles 2 are alloy particles and hence me sufficiently sintered into a close contact with the base matrix alloy 4. Additionally, the particles 2 have thereon a round surface in shape. Thus, as shown in FIGS. 1 and 2, a frictional heat generated during the base matrix alloy 4 supports the rotating shaft 1, heat is dissipated without any obstacle. Like reference numerals in FIGS. 1 and 2 designate like parts in FIGS. 3 and 4.

In detail, as to the slide bearing shown in FIGS. 1 and 2, the hard material particles 2 of alloy particles are sufficiently sintered into a close contact with the base matrix alloy 4. The close contact protect Pb liquid phase 3 from flowing into the surrounding of hard material particles 2. Thus, current 6 of frictional heat is smoothly dissipated without any obstacle to the base matrix alloy 4 and then to the back steel sheet 5, and it is thus possible to suppress temperature rise of the bearing surface with the lubricating oil circulation.

This property is important particularly under the boundary lubricating condition without using the lubricating oil circulation. Namely, in the case when scanty lubricating oil is present or when the viscosity of the lubricating oil is low, the lubricating condition prevailing between the slide bearing and the rotating shaft is converted into the boundary lubricating condition. In the boundary lubricating condition. The frictional heat, which is generated due to the direct contact of the hard material particles with the surface of the rotating shaft, makes an increase in a great amount and also is not allowable to be dissipated into the outside by utilizing the lubricating oil circulation.

For this reason, the property of dissipating the frictional heat through the base matrix is an important facter, which depends upon a performance of the slide bearing.

As for the life of the slide bearing, in the case when the property of dissipating the frictional heat is superior, the surface of the slide bearing has less waste of the Pb phase.

Therefore, it is possible to maintain a stable lubricating state.

In other words, from the standpoint of dissipation of the frictional heat, it is important where each metallic particles to be added are closely contacted with the base matrix, by sintering process. This is confirmed according to the result of a cavitation test.

As has been described before, the precipitated particles with high hardness to be added should meet the following requirements.

1) The precipitated particles should have a Vickers hardness ranging from 700 to 800 Hv.

2) The precipitated particles should have a sintering property, such that they have a tendency to form easily a closed contact with the base matrix during the course of sintering.

3) Additionally, the precipitated particles should be prepared by such a fashion that they have thereon spherical shape.

It will thus be seen that Co base alloys, particularly Cr—Mo—Si—Co system alloys are adequate as precipitated particles meeting the above requirements.

As noted above, the precipitated particles to be added to the base matrix are preferably spherical or nearly spherical or partly round in shape, and the particle diameter is preferably adjusted to 100 µm or below. With use of the precipitated particle having this particle diameter range, the heat dissipating property of whether the friction heat may be dissipated through the base matrix or not is improved, in comparison with the use of the particle with the diameter of 100 µm or above. Furthermore, the particles with the diameter range of 100 µm or below permits an improvement of the abrasion resisting property, in spite of addition in less amount of precipitated particles.

The reason for setting the contents of the sliding or bearing material according to the invention is explained as followed. The explanation is divided into two groups, such as of base matrix and of the particles to be added and precipitated.

1. Base Matrix.

The base matrix comprises a lead bronze alloy. The lead bronze alloy consist in 1 to 30% by weight of Pb and 1 to 15% by weight of Sn, the remainder being Cu for the following reasons.

(1) Pb (1 to 30% by weight of Pb)

Pb is a soft component, and contributes to an enhancement of the lubricating property. Particularly, in the case when the lubricating condition prevailing between the slide bearing and the rotating shaft reaches a boundary lubricating condition without utilizing the lubricating oil, the abrasion can be reduced by making an acceleration of generating the Pb liquid phase in the base matrix.

However, in the case when the Pb to be added is below 1%, this effect due to the addition of Pb cannot be obtained.

On the contrary the Pb content exceeding 30% makes a reduction of the mechanical strength of the base matrix. The excessive addition of Pb causes a fusion in a great amount of Pb, thereby resulted in forming a liquid pool of Pb during the course of supporting the rotating shaft by the slide bearing. For this reason, the Pb content is preferably not higher than 30%.

(2) Sn (1 to 15% by weight of Sn)

Sn is mixed with Cu to form the Cu—Sn alloy in the base matrix, whereby enhancing the mechanical strength of the base matrix. In the case when the Sn content is below 1%, the effect due to the addition of Sn is not so much. The Sn content exceeding 15% causes a generation of Cu—Sn compound materials, which make a reduction of toughness with respect to the sliding material. Besides, the behavior of the Cu—Sn compound materials precipitated in the base matrix is like that of the intermetallic material particles to be added to the prior art sliding material. For these reasons, the Sn content is preferably not higher than 15%.

2. Hard Material Particles (0.5 to 20% by weight of the sintering layer with the base matrix)

As described above, the sintering layer consists of the base matrix and the hard material particles embeded in the base matrix.

The-hard material particles are dispersed and precipitated in the base matrix of the sintered layer, by such a fashion that the sintered layer has therein 0.5 to 20% by weight of hard material particle. The hard material particle to be added according to the invention is Co base alloy particles, particularly Cr—Mo—Si—Co alloy particles.

The Co base alloy particles are prepared by such a fashion that each of these particles consists of a Co base matrix and hard metals i.e., comprising Cr, Mo, Si and Co, which are precipitated in the Co base matrix. This chemical composition of the Co base alloy particles provides a hardness suitable for the sliding material, such as the slide bearing or the like, and also enables an enhancement of sinterability of the Co base alloy particle, resulted in forming a closed contact of the Co base alloy particles with the base matrix of the sliding material.

(1) Cr (7.5 to 9.5% by weight of Cr)

Cr alone forms a hard phase precipitated in the base matrix consisting of the Co base alloy particles. The forming of this hard phase in excess causes to make the Co base alloy particle too hard, resulted in forming the Co base alloy particles with excessive high hardness, which enable to harden excessively the sliding material.

Based on this reason, the preferable range of the Cr content is between 7.5 and 9.5%. The use of Co base alloy particle with preferable range of Cr content enables a preparation of the sliding material with Vickers hardness of 700 to 800.

(2) Mo (27 to 30% by weight of Mo)

Mo forms together with Cr and Co particles a hard phase precipitated in the Co base matrix. Mo particle alone contributes to the hardening of the base matrixs of the sliding material and the base matrix of Co base alloy particles. Additionally, Mo improve a sinterability of the Co base alloy particle with respect to the base matrix of the sliding material.

Consequently, a prefarable range of Mo content is be selected by taking into consideration of the balance with the other components, the hardness of Co base alloy particles the sliding material and the sintering property of Co base alloy particle respect to the base matrix of the sliding material. From the above reason, the preferable range of the Mo content is 27 to 30%.

(3) Si (2.0 to 3.0% by weight of Si)

As said in the above, Si is known as hardening component. Si content in excess has a tendency of generating an intermetallic compound particle together with Co. The intermetallic compound particle causes a reduction of the toughness of the sliding material. However, it is necessary that Si containing material is used as a flux material at the time of preparing the Co base alloy particle. Therefore, the Co base alloy particle has therein more or less Cr content.

From this point, it is preferably to make a reduction of Cr content to lower limit thereof.

To this end, the inventors have a review of Cr content, which is followed.

In the case that the upper limit of the Si content is 3%, any precipitate of the entermetallic compound of Si and Co, cannot be generated. Something generated due to an interaction of Si and Cr is a solid solution, which is dissolved into the Co base matrix of the Co base alloy particle.

On the contrary, existence of Si in Co base alloy particle makes an enhancement of the sinterability of the Co base alloy particles. Accordingly, Si content ranging between 2.0% and 3.0% is suitable for maintaining a hardness (Hv) of 700 to 800. The Si content ranging between 2.0 and 3.0% has an effect of sufficiently suppressing an oxidation of Co during the course of melting for preparing the Co alloy, and is suitable for maintaining an adequate hardness of the bearing material.

(4) Co, remainder

Co is known as an expensive metal, compared with the other metal or components contained in the Co base alloy particle. From the standpoint in this regard, it is preferably that Co content is lowered to a level, as less as possible.

On the contrary, owing to enhancement of the abrasion resisting property and sinterability, it is preferably that the Co base alloy particle is rich in Co.

From the above reason, the Co base alloy particles having the above composition are added by 0.5 to 20%.

When the Co base alloy particles are added by no more than 0.5%, they have no substantial effect thereof. On the hand, when the content of the Co base alloy particles exceeds 20%, they will be precipitated in the base matrix of the sliding material, by such a fashion that they are coupled to one another. As a result, an existence of Co base alloy particle of 20% or over have adverse effects on the sinterability of the base matrix of the sliding material.

An example will now be described.

EXAMPLE 1

As shown in FIG. 2, sliding material samples Nos. 1 to 9 were prepared by the following process.

The process was subjected to steps, of mixing 2.5 to 10% of the Co base alloy particles with the lead bronze alloy particles constituting the base matrix of the sliding material, by such a fashion that the total amount of two particles is 100%, thereby forming a resultant mixture, of putting the mixture with a predermined thickness on the back steel sheet, and of sintering the mixture with the back steel sheet in the hydrogen atmosphere at a temperature of 700° C. to 900° C. for 10 to 30 minutes, thereby obtaining Samples Nos. 1 to 6 shown in Table 2.

TABLE 2 the abrasion test results

| Sample No. | Base Alloy particle (%) | | | Hard material particle | | Abrasion Rate ($\mu$m) | | Temperature of Back Steel plate (° C.) |
|---|---|---|---|---|---|---|---|---|
| | Cu | Sn | Pb | particles | added (%) | A | B | |
| 1 | Balance | 2 | 23 | Co base alloy particle | 2.5 | 0.5 | 4.0 | 67 |
| 2 | " | 2 | 23 | Co base alloy particle | 5.0 | 0.5 | 3.0 | 65 |
| 3 | " | 2 | 23 | Co base alloy particle | 10 | 0.5 | 3.0 | 60 |
| 4 | " | 10 | 10 | Co base alloy particle | 2.5 | 0.4 | 4.5 | 73 |
| 5 | " | 10 | 10 | Co base alloy particle | 5.0 | 0.5 | 4.0 | 75 |
| 6 | " | 10 | 10 | Co base alloy particle | 10 | 0.6 | 4.0 | 77 |
| 7 | " | 2 | 23 | Ni—B particle | 5 | 2.0 | 7.0 | 90 |
| 8 | " | 2 | 23 | $Fe_3P$ particle | 5 | 3.1 | 8.0 | 120 |
| 9 | " | 2 | 23 | None | | 0.1 | 29.0 | 120 |

Note Sample No.: Sample No. of sliding material.
Base Alloy Particle: Particles constuting the base matrix of the sliding material.
Hard material particles: Particles precipitated in the base matrix of the sliding material.
Reference A: Abrasion Rate of Rotating Shaft.
Reference B: Abrasion Rate of Sliding material.

In the samples Nos. 1 to 9, all of the samples are common to have therein the base matrix of the lead bronze alloy, but they are different in the hard material particles to be added.

As to the samples Nos. 1 to 6, the hard material particles to be added are common to be the Co base alloy particle, which is composed of 28% of Mo, 8% of Cr and 2.5% of Si, the remainder being Co. Additionally, these samples Nos. 1 to 6 are common to have therein 2 phase precipitates comprising the base matrix of lead bronze alloy and the Co base alloy particles precipitated therein.

The sample Nos. 7 to 9 were prepared as the reference samples, owing to the comparision thereof with the samples Nos. 1 to 6. Among the reference samples Nos. 7 to 9, the sample 7 has therein the hard material particle composed of Ni—B intermetallic compound particle, while the sample 8 has therein the hard material particle composed of Fe, P intermetallic compound. The reference sample No. 9 have no additive of the hard material particle.

In addition to this, each of samples Nos. 1 to 9 was prepared by a process comprising steps, as followed.

The sintered layer adhering onto the back steel plate was subjected in sequence to first rolling step, heating step and final rolling step.

In the above steps, the first rolling step was conducted by using the roll mill, thereby compacting the sintered layer in such a manner that the density of the sintered layer being compacted was raised to aprox. 100%. The heating step had the object of arranging the sound base matrix of the sintered layer by heating at a temperature ranging between 700 and 900° C.

Each of samples obtained by in the above steps had thereon thickness of 2.20 mm. By using the samples, the bearing members, such as bush, were prepared owing to a review of the abrasion resisting property of the samples. The bearing members have thereon an inner diameter of 20 mm, a length of 20 mm and a thickness of 2.0 mm.

The abrasion resisting property test was conducted under conditions as shown in Table 3.

TABLE 3

The conditions of the abrasion test

| Remarks | Conditions | Unit |
|---|---|---|
| Dimensions | | |
| Inner diameter | 20 | mm |
| Length | 20 | mm |
| Material of the rotating shaft | JIS S55C | |
| Hardness of rotating shaft | 600 | Hv (Vickers hardness) |
| Surface roughness (Rmax) of rotating shaft | 1.0 | $\mu$m |
| Revolution rate of rotating shaft | 350 | rpm |
| Applied load | 150 | kg/cm$^2$ |
| Test interval | 24 | hrs. |
| Lubricating oil | Light oil | |

Samples Nos. 1 to 6 are were prepared by using sliding materials according to the invention. Samples Nos. 7 to 9 are shown as reference samples and included a prior art example.

The abrasion test was conducted by using light oil as lubricating oil under conditions, which were nearly closed to the boundary lubricating conditions. Additionally, by the abrasion test, the abrasion rates with respect to the bearing member and the rotating shaft supported shaft, by the bearing member and also the back surface temperature of bearing member were measured, respectively. Table 2 shows the result of measurements.

The results shown in Table 2 teaches that all of samples Nos. 1 to 6 had lower abrasion rate, such as 3.0 to 4.5 $\mu$m, and lower back plate surface temperature, such as 60 to 70° C., by comparision of samples Nos. 1 to 6 with the reference samples Nos. 6 to 9, because these samples Nos. 1 to 6 had therein the Co base alloy particles constituting the hard material particles according to the invention. Summing up, the results shown in the table 2 teaches that samples Nos. 1 to 6 enables a rapid dissipation of the frictional heat generated due to the sliding friction between the sliding member and the rotating shaft supported thereby.

As to the base matrix of the sliding material, an increase in amount of the Pb content has generally a tendency of causing a reduction of the abrasion rate. However, according to results of the table 2, in spite that the Pb content of reference samples Nos. 7 and 8 is more than the Pb content of the sample No. 5, the sample No. 5 has less abrasion rate than that of reference sample Nos. 7 and 8. This teaches that the sliding material according the invention is greater in the abrasion resisting property than the prior art sliding material.

As shown above, according to the present invention, it is possible to obtain a sliding material, which can minimize an abrasion rate of the rotating shaft and has therein excellent abrasion resisting property under boundary lubricating conditions without utilizing the circulation of the lubricating oil. Industrial utilizablity of the invention.

As has been described in the foregoing, the bearing material or sliding material according to the present invention has charactering matters, such that the sliding material comprises a back steel sheet and a sintered bearing layer adhering thereon, that the sintered layer has therein the hard material particles dispersed and precipitated therein, and that as the hard material there are used Co base alloy particles containing Cr, Mo and Si, the remainder being Co.

Thus characterizing matters causes a provision of excellent abrasion resisting property with the sliding material according to the present invention, and also enables a reduction of the abrasion rate of the rotating shaft supported by the sliding material, even under severe boundary lubricating conditions.

In addition to this, the sintered layer has therein the hard material particles with the chemical composition forming two phases, such as the Co base texture of the Co base alloy and the hard material particles precipitated therein, and also the fashion of precipitating the hard material particles are uniform.

From the reasons, the hard material particles has a satisfactory property of sinterability with respect to the base matrix of the sintered bearing layer. In the sliding material of this invention, the frictional heat generated due to contact friction the sliding material and the rotating shaft can be rapidly dissipated through the sliding material, by utilization of the base matrix of lead bronze alloy.

What is claimed is:

1. An abrasion resistant sliding material which comprises a back steel sheet and a sintered bearing layer integral with one surface of the back steel sheet, wherein said sintered bearing layer has therein a base structure material and 0.5 to 20% by weight of hard material particles dispersed and precipitated in said base structure material, that the base matrix material is composed of 1 to 30% by weight of Pb, 1 to 15% by weight of Sn, and remainder being substantially Cu, and that the hard material particles is composed of 7.5 to 9.5% by weight of Cr, 27 to 30% by weight of Mo and 2.0 to 3.0% by weight of Si, the remainder being Co.

2. The abrasion resistant sliding material according to claim 1, wherein said hard material particles are prepared by the atomizing process.

3. The abrasion resistant sliding material according to claim 1, wherein said hard material particles have a Vickers hardness (Hv) of 700 to 800.

4. The abrasion resistant sliding material according to claim 1, wherein said hard material particles have therein two-phases, said two-phases has one phase consisting essentially of Co and another phase consisting essentially of a hard precipitate of Cr—Mo—Si—Co alloy particles.

5. The abrasion resistant sliding material according to claim 1, wherein said hard material particles are substantially round in shape.

6. The abrasion resistant sliding material according to claim 1, wherein said hard material particles have a diameter of 100 $\mu$m or below.

* * * * *